May 15, 1951   F. S. CHRISTIAN, JR., ET AL   2,553,527
HOLDER FOR BOXCOVERS
Filed March 2, 1949
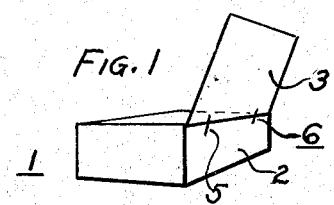
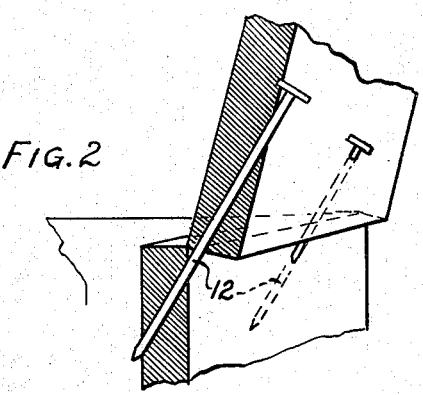
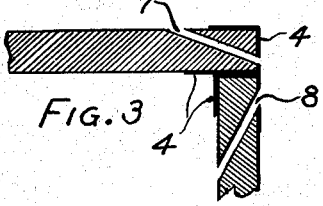
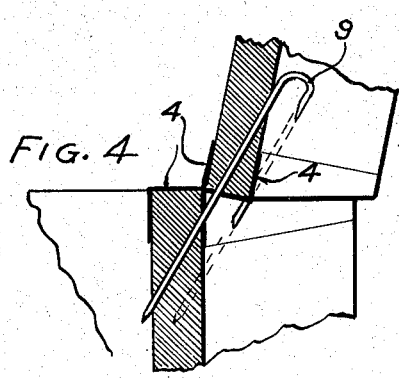
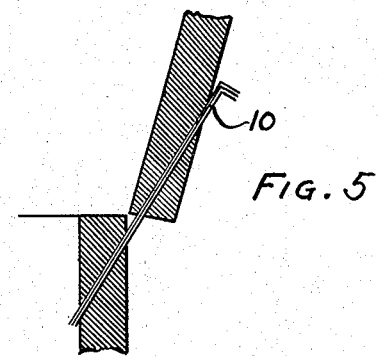
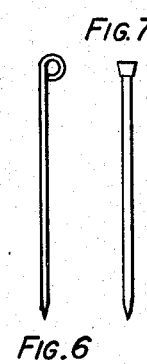
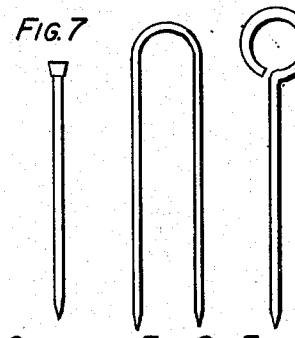
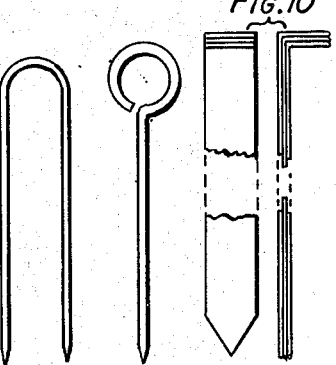
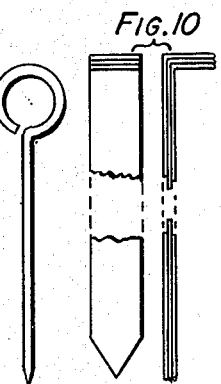
Frank S. Christian, Jr.
George N. Lemmon
INVENTORS.
BY
G. N. Lemmon
Agent.

Patented May 15, 1951

2,553,527

UNITED STATES PATENT OFFICE 2,553,527

HOLDER FOR BOX COVERS

Frank Stanley Christian, Jr., Orange, Calif., and George N. Lemmon, Birmingham, Ala.; said Lemmon assignor to said Christian Application March 2, 1949, Serial No. 79,164

5 Claims. (Cl. 217—61)

This invention relates to cover holders suitable for supporting in an upright open position the covers of boxes containing articles which are on display. It is particularly suitable for use with cigar boxes which are open for display to customers, and which are often held by the cover as the salesman extends the box towards the customer.

One purpose is to provide a simple and effective support which can easily and quickly be attached to the box as soon as it has been opened; another purpose is to enable the salesman to change readily the angle at which the cover is held; another purpose is to provide an efficient device so simple, small and inexpensive that one can be packed in every box of cigars with only a negligible increase in cost to the cigar manufacturer, and other purposes will be evident from the specification and claims.

Essentially, the invention is to provide a hole in the cover of the box adjacent to the hinge, and a holder preferably of metal which may be inserted readily by hand into the hole, and this holder by making contact with the back of the box prevents the cover from being opened beyond the desired position. For one type of holder a hole is also provided in the back of the box which hole shall be in alignment with the hole in the cover when the cover is opened to the desired position. In such case, the holes in both the cover and the back are preferably diagonal, and when the holder has been inserted the cover is held against either closing or opening. In all cases, the proportions are such that the holders fit snugly into the holes.

Referring to the drawings, Figure 1 is a small scale view of an open box with indications of the locations where cover holders may be applied; Figure 2 shows in enlarged scale in section and in perspective one type of holder as it appears in use; Figure 3 in enlarged scale shows in section the hinge portion of a box with cover closed, and it shows the location of diagonal holes provided in the cover and in the back of the box into which a holder is to be inserted after the box has been opened; Figure 4 shows, similarly to Figure 2, a holder with two parallel members instead of a single member; Figure 5 shows similarly the appearance of holders which are flat rather than round; and Figures 6, 7, 8, 9, and 10 show some forms of holders which may be used with this invention.

Referring to Figures 1, 3 and 4 the box 1 has a back 2 and a cover 3 which are movably held together by the hinge 4, which is usually made of cloth or paper, or a combination of cloth and paper, and which is glued to both back and cover. In some figures the indication of the hinge itself is omitted for simplicity. At one or more selected locations such as 5, 6 holes are made in the cover to receive the holder or holders when the box is being opened for display. In Figures 2, 3, 4 and 5 holes are also provided in the back of the box each of which will be in alignment with a corresponding hole in the cover when the cover has been opened to the desired position. Then the proper holder is inserted as indicated in Figures 2, 4 and 5, and the cover is thereby held against either closing or opening further.

In Figure 2 two holders 12, 12 are used, each being similar to a long common wire nail; Figure 4 shows a single long U-shaped holder 9 made of wire and shown by itself in Figure 8; Figure 5 indicates a holder 10 made of three strips of thin sheet metal pointed at one end and with the top bent out to form a handle, as shown in Figure 10 in larger scale and in two views. For such holders the holes will be slotted or flat instead of round.

In all cases, the holes have openings into the cover through the narrow face which, when the cover is open, is the lower edge of the cover. And since the holes originally are made smaller than the holders, the holders when inserted are held firmly by pressure from the material which comprises the cover itself. In all cases the hinges are the same as those shown in Figures 3 and 4. Therefore the fibrous material of the hinge reinforces the holes in the lower edge of the cover, and it also helps prevent splitting of the cover.

Figure 6 shows a single holder with a small ring at its upper end; and Figure 7 shows a so-called finishing nail which may be used as a holder. Holes in all covers are of such size as to be a snug fit for the holders, and a holder may be twisted by hand as it is being inserted or removed.

These holders may be of many other forms or types, but in every case each holder is preferably of such design and of such material that it is reasonably stiff but that it will withstand a considerable amount of bending and re-bending without fracture. The hinge material adheres to the cover and to the back and it reenforces the wood or fiber of which the box and its cover are made, so that the holes in cover and back will thereby withstand greater pressures from the holders without serious enlargement. The member, size and stiffness of the holders for each size and type of box may be so selected as to give the best results in each case.

When a box is properly equipped with suitable holders, the cover is amply stiff to serve as a means for holding the box, and yet the angle at which the cover stands may be readily changed by merely forcing the cover into the new position. In such case the holder or holders will be bent but the holes in the box back and cover will not be materially distorted.

We claim:

1. In combination, a box having a back and a cover hinged together, a hole formed diagonally in the cover adjacent to the hinge and a second hole diagonally placed in the back, said two holes being in alignment with each other when the cover is in open position, together with a stiff holder insertable into both holes when they are thus in alignment to keep the holes so aligned and thereby to resist the closing or the further opening of said cover.

2. The combination of a box and a cover and a holder as described in claim 1, in which fibrous material is glued to the cover and the back of the box adjacent to their hinged connection, and in which this fibrous material is pierced by the holder in at least one place.

3. The combination of a box and a cover and a holder as described in claim 1, in which the holder is made of round wire.

4. The combination of a box and a cover and a holder as described in claim 1, in which the holes in cover and back are flat holes and in which the holder is made of one or more flat strips of metal.

5. The combination of a box and a cover and a holder as described in claim 1, in which the holder is an elongated U-shaped member of wire and in which the holes in cover and back are pairs of holes into which the U-shaped holder may be inserted.

FRANK STANLEY CHRISTIAN, Jr.
GEORGE N. LEMMON.

REFERENCES CITED

The following references are of record in the file of this patent:

UNITED STATES PATENTS

| Number | Name | Date |
| --- | --- | --- |
| 486,503 | Raymond | Nov. 22, 1892 |
| 676,325 | Kubias | June 11, 1901 |
| 684,442 | Little | Oct. 15, 1901 |
| 747,997 | Mitchell | Dec. 29, 1903 |
| 1,621,704 | Adamson | Mar. 22, 1927 |
| 1,822,384 | Spinner et al. | Sept. 8, 1931 |
| 2,339,933 | Lilienfield | Jan. 25, 1944 |